United States Patent
Suzuki

[11] 3,830,110
[45] Aug. 20, 1974

[54] ENGINE STARTING DEVICE
[75] Inventor: Keiji Suzuki, Tokyo, Japan
[73] Assignee: Honda Giken Kogyo Kabushiki Kaisha, Tokyo, Japan
[22] Filed: Jan. 11, 1973
[21] Appl. No.: 322,874

[30] Foreign Application Priority Data
Jan. 13, 1972 Japan.................................. 47-6070

[52] U.S. Cl....................... 74/6, 74/551, 192/67 R, 123/179 C, 123/179 SE
[51] Int. Cl............................................. F02n 1/00
[58] Field of Search .......... 74/6, 42, 142, 550, 551, 74/545, 625; 123/179 C, 179 SE; 192/42, 63

[56] References Cited
UNITED STATES PATENTS
1,539,190   5/1925   Hookom .............................. 74/551
2,772,578   12/1956   Kling................................ 74/625 X Primary Examiner—Samuel Scott
Assistant Examiner—Frank H. McKenzie, Jr.
Attorney, Agent, or Firm—Eric H. Waters

[57] ABSTRACT

A device for starting a small-sized engine mounted on a light vehicle, including a cranking lever associated with clutch means arranged in the power drive train and movable between a normal inoperative position locked against cranking motion and a position unlocked for cranking operation to serve also as a clutch operating lever. It enables any inexperienced rider to start the motored vehicle with ease practically in a single stroke.

1 Claim, 3 Drawing Figures

PATENTED AUG 20 1974 3,830,110

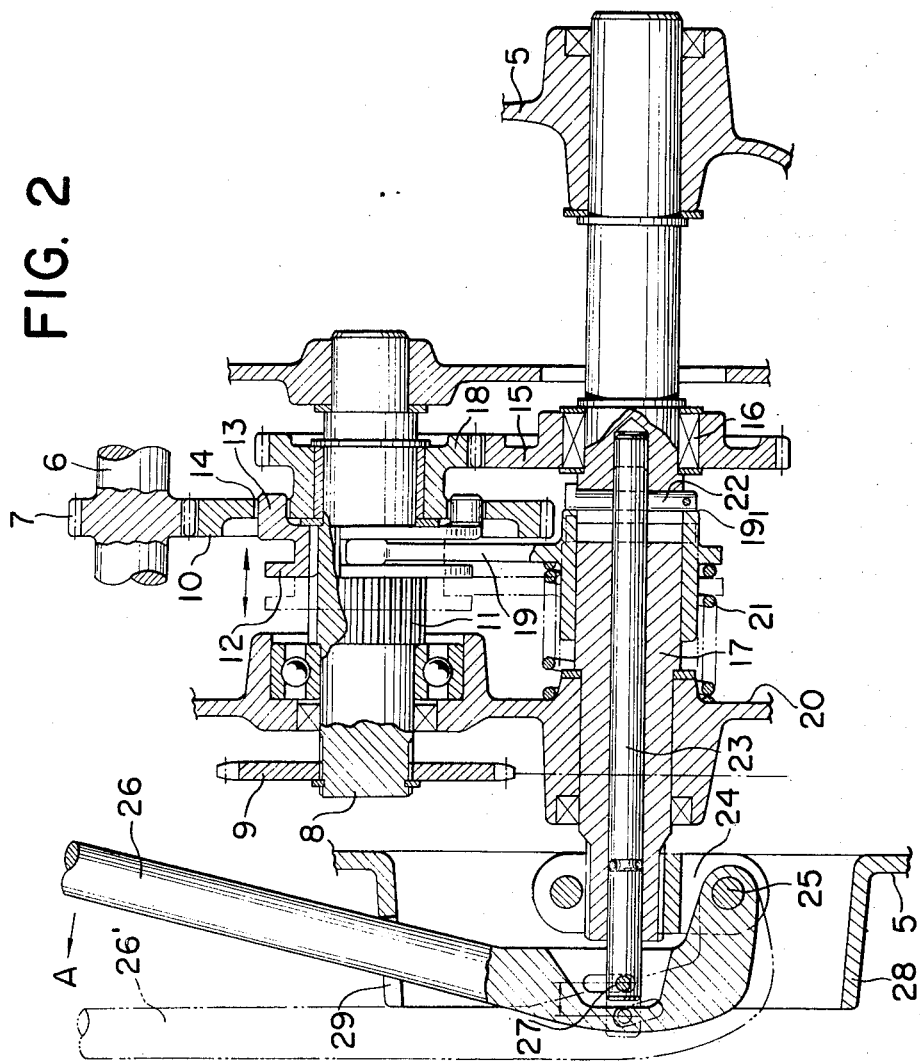

ENGINE STARTING DEVICE

BACKGROUND OF THE INVENTION

This invention relates generally to engine starting devices and more particularly to those usable on playground cars, invalid chairs or other light vehicles of the self-propelled type.

Usually, motored vehicles of the character described have no transmission or speed change gearing in their power drive train for simple construction and ease of operation and naturally there is no gear shifting into neutral position to enable the engine to idle. This means that the vehicle is caused to start running at the same time when the engine is started. Such inconvenience in operation can be avoided by arranging appropriate clutch means in the power drive train in any known manner. This, however, naturally makes it necessary for the rider to operate the clutch in each engine starting operation and is thus undesirable, making the vehicle unsuitable for a child or other inexperienced person to ride.

SUMMARY OF THE INVENTION

The present invention has for its object the provision of a novel engine starting device particularly adapted for use on a light motored vehicle of the character described and which enables the rider to start the vehicle engine in a single continuous operation.

According to the invention, there is provided an engine starting device which includes a sole operating lever associated not only with the engine crankshaft for cranking operation but also with appropriate clutch means arranged in the power drive train to serve as a clutch operating lever, said operating lever being movable in a direction intersecting the plane of cranking operation between a normal clutch-engaging position locked against rotation and a clutch-disengaging position released for cranking operation.

BRIEF DESCRIPTION OF THE DRAWINGS

The above and other objects, features and advantages of the invention will become apparent from the following description when taken in conjunction with the accompanying drawings, which illustrate diagrammatically and by way of example one preferred embodiment of the invention and in which:

FIG. 2 is a longitudinal cross-sectional view of the engine drive system incorporating the engine starting device of the invention.

DESCRIPTION OF THE PREFERRED EMBODIMENT

Figure 1:
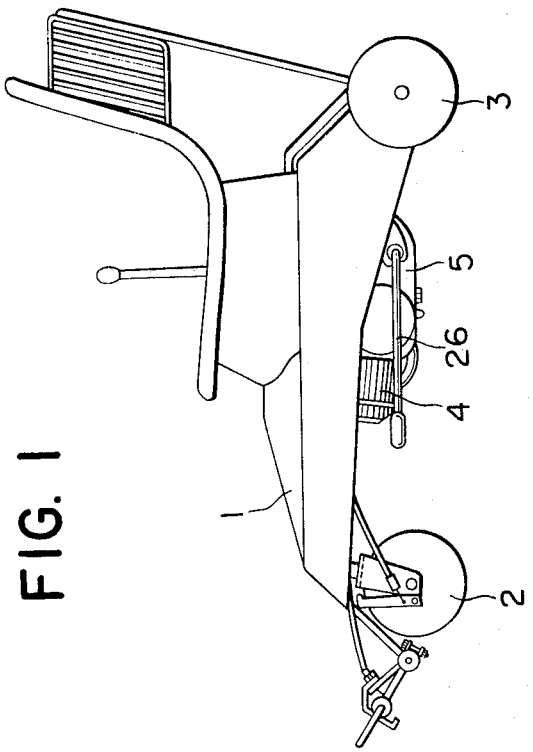
FIG. 1 is a side view of a light self-propelled vehicle embodying the present invention.

Referring to the drawings and first to FIGS. 1 and 2, reference numeral 1 indicates the body of the vehicle illustrated; 2, a steering wheel; 3, drive wheels; 4, an internal combustion engine mounted on the vehicle; 5, a drive gear casing; 6, a countershaft carrying an intermediate drive gear 7; and 8, a wheel drive shaft on which a terminal drive gear 9 is fixedly mounted, as shown, taking the form of a sprocket wheel for chain drive. Loosely mounted on the wheel drive shaft 8 is a composite gear member comprised of a gear wheel 10 meshing with the intermediate gear 7 and another gear wheel 18 formed integral with gear wheel 10 and having a diameter smaller than that of the latter. The gear wheel 10 has a number of axially extending through holes 14 formed in the web portion thereof to serve the purpose described below. The wheel drive shaft 8 has a splined portion 11, on which a slider member 12 is loosely fitted for axial sliding movement and held against rotation relative to the drive shaft 8. The slider 12, having a number of lateral projections or pins 13 formed for fitting engagement with the holes 14 in the web of gear 10, forms in conjunction with the latter a slide clutch mechanism operable to connect and disconnect the wheel drive shaft 8 from the engine crankshaft, not shown. The slider 12 has an annular groove formed around the periphery thereof to receive a shifter fork 19.

Reference numeral 17 indicates a starter shaft which is arranged in parallel with the wheel drive shaft 8 and on which said shifter fork 19 is slidably mounted. A starter gear 15 is mounted on the starter shaft 17 through the medium of a one-way clutch 16 for unidirectional drive in meshing engagement with the gear portion 18 of the composite gear member 10, 18 mounted on the wheel drive shaft 8. A coiled compression spring 21 is arranged between a portion of the bearing frame 20 and the shifter fork 19 to urge the latter and hence the slider 12 to the right, as viewed in FIG. 1. With this arrangement, it will readily be understood that the laterally projecting pins 13 formed on the slider 12 are at all times in a tendency to fit into the respective holes 14 formed in the gear wheel 10 for driving connection.

A clutch operating rod 23 is slidably fitted in the starter shaft 17 coaxially therewith and at its inner end carries a pin 22 which extends through the rod 23 and starter shaft 17 to engage with the adjacent end face $19_1$ of the hub portion of the shifter fork 19. In order to slidably receive the pin 22, the starter shaft 17 is formed with an axially elongate diametral slot, as shown. The clutch operating rod 23 is connected at its outer end with an operating lever 26 by means of a pin 27 fixed to the rod end and fitted in an elongate slot formed in the operating lever 26.

The operating lever 26 is pivotally secured at an appropriate radial distance from the adjacent end of the starter shaft 17 by means of a bracket 24, as indicated at 25. The casing 5 is formed adjacent to the shaft end with an opening encircled by an annular flange 28, which is formed with a notch 25 to receive the operating lever 26, which is normally urged to the right under the bias of coiled spring 21 through the medium of the shifter fork 19, pin 22 and clutch operating rod 23. The operating lever 26 in the illustrated embodiment is a manually operable lever but may take the form of a kick pedal lever.

In FIG. 2, the operating lever 26 is shown in its normal, locked position engaged in the notch 29 and the clutch operating lever 23 is shown in its retracted position holding the slider clutch 12 in engaged position.

Figure 3:
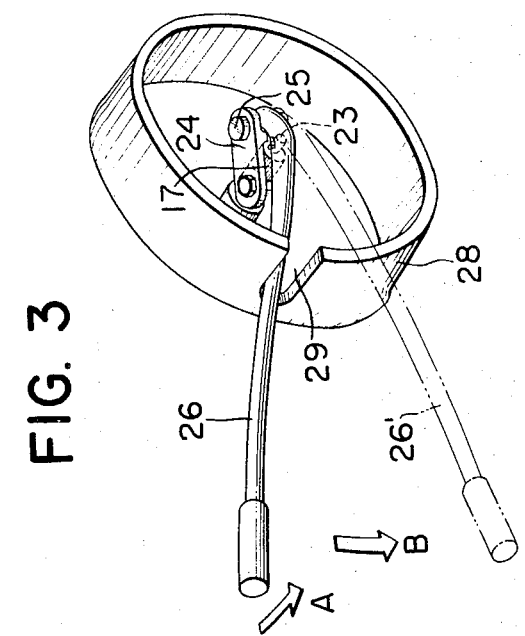
FIG. 3 is a fragmentary perspective view of the operating lever and associated parts of the device.

To start the engine, the operating lever 26 is first released out of the notch 29 for cranking operation; that is, it is swung in the direction of the arrow A in FIGS. 2 and 3, which intersects the plane of cranking operation at substantially at right angles thereto, to assume the position indicated by the dotted lines 26'. It is to be noted that with such swing movement of the cranking lever 26 the clutch operating rod 23 is drawn axially forward to shift the slider 12 out of clutching engagement with the gear wheel 10, as indicated by the dotted lines, through the medium of the pin 22 and shifter fork 19 against the bias of the coiled spring 21. Subsequently, the operating lever 26 is turned along the annular edge of flange 28 as indicated by the arrow B in FIG. 3 to rotate the starter shaft 17. The starter gear 15 on the shaft 17 is driven together therewith through the one-way clutch 16 to rotate the composite gear member 10, 18, now freely rotatable relative to the wheel drive shaft 8, and hence through intermediate gear 7 the countershaft 6 and the engine crankshaft, not shown, so that the engine is started.

After the engine has been started in this manner, the cranking lever, i.e., operating lever 26 is turned back until it is aligned with the notch 29 in the annular flange 28 and released to drop into notch 29 under the bias of coiled spring 21 acting through the shifter fork 19 and clutch operating rod 23. Simultaneously with this, the slider clutch 12 is restored to its normal, engaged position by the shifter fork 19 to establish driving connection between the engine and drive wheels 3. In this state, the starter shaft 17 is kept stationary together with the clutch operating rod 23 though the starter gear 15 on the shaft 17 is driven continuously to rotate by the composite gear member 10, 18, which is in meshing engagement with the gear 7 on the engine countershaft 6. It is to be noted at this point that the sole operating lever 26 is kept retracted in the position locked in notch 29 during the whole period of drive of the vehicle so that it does not form any encumbrance to the rider and there is no danger of inadvertently swinging or turning the operating lever.

To summarize, the engine starting device of the present invention is so arranged and constructed that the clutch connection in the power drive train can be broken automatically with initial unlocking operation of swinging the cranking lever from its normal locked position to the operative position in which the lever can be freely turned to start the engine. In other words, with the engine starting device, clutch operation and engine cranking operation can be performed consecutively in a single continuous operation of the cranking lever. It will thus be readily appreciated that the device of the invention enables any inexperienced rider to start the vehicle with ease and can advantageously be employed on various forms of light motored vehicle.

It will be apparent to those skilled in the art that the invention is not restricted to the features described above and shown in the drawings but may be varied in many ways within the scope of the appendant claims.

What is claimed is:

1. In an engine starting device for a light-duty vehicle including a power transmission mechanism for transmitting driving power from the engine of said vehicle to drive wheels thereof, clutch means in said power transmission mechanism for braking and establishing a driving connection between said engine and drive wheels, and a manually operated starter shaft connected to said power transmission mechanism at a position between said engine and clutch means through a one-way clutch, the improvement comprising a cranking lever pivoted to said starter shaft at a point radially spaced from the axis thereof for rotating the latter, a clutch operating rod arranged in alignment with said starter shaft and connected at an outer end thereof to said cranking lever for axial sliding movement relative to said starter shaft in accordance with axial displacement of said cranking lever, said clutch operating rod being normally biased inwardly by spring means to render said clutch means operative, a gear casing, and an annular flange formed on the outer side of said gear casing of and extending outwardly and coaxially of said starter shaft so as to guide the engine starting movement of said operating lever along the outer peripheral edge of said flange, said annular flange having therein a notch which receives and locks said cranking lever against cranking operation when said lever is released to swing under the bias of said spring means and simultaneously allowing said cranking lever to move therealong for clutching and declutching operation.

* * * * *